3,517,936
OPTICAL ILLUSION DEVICE
Alan A. Hicks, Weston, Conn., and Ernest J. Swimmer, New York, N.Y., assignors to Kohner Bros., Inc., East Paterson, N.J., a corporation of New York
Filed May 20, 1968, Ser. No. 730,317
Int. Cl. A63f 7/04
U.S. Cl. 273—115     22 Claims

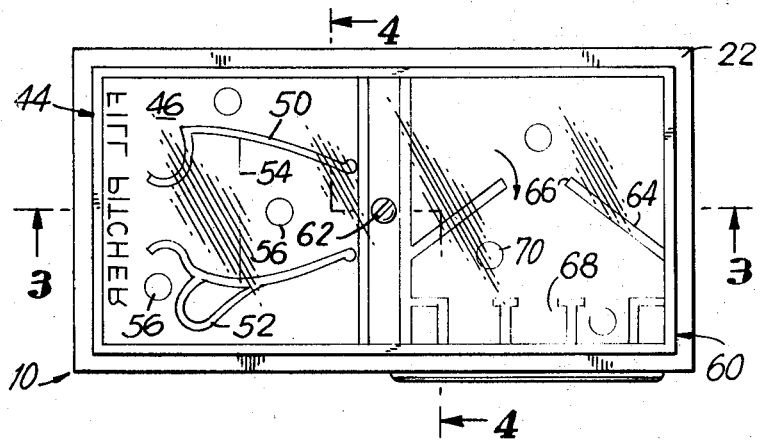
FIG.1
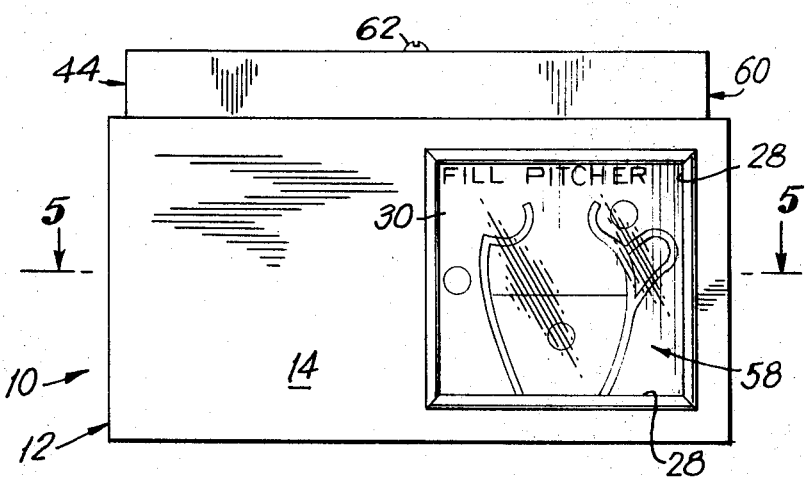
FIG.2
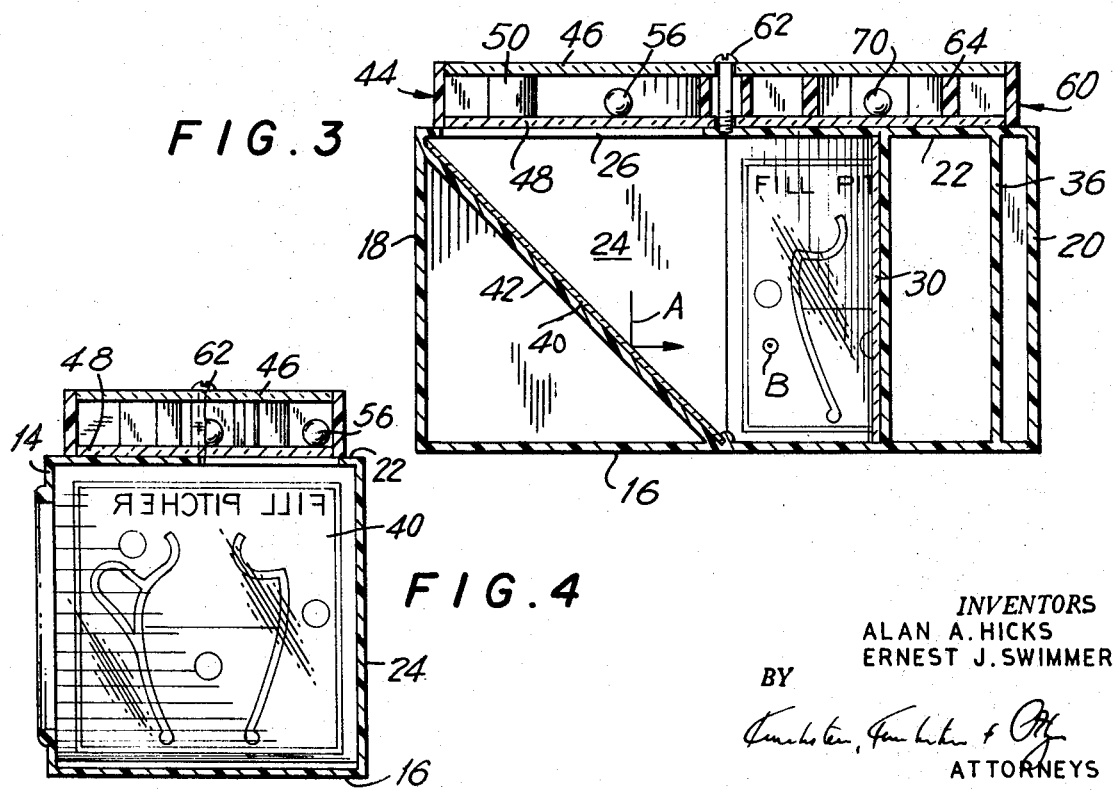
FIG.3
FIG.4
INVENTORS
ALAN A. HICKS
ERNEST J. SWIMMER
BY
ATTORNEYS June 30, 1970  A. A. HICKS ET AL  3,517,936
OPTICAL ILLUSION DEVICE
Filed May 20, 1968  3 Sheets-Sheet 2
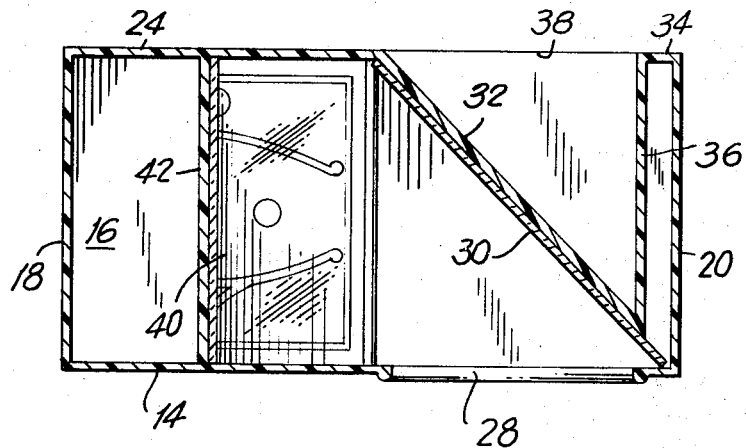
FIG.5
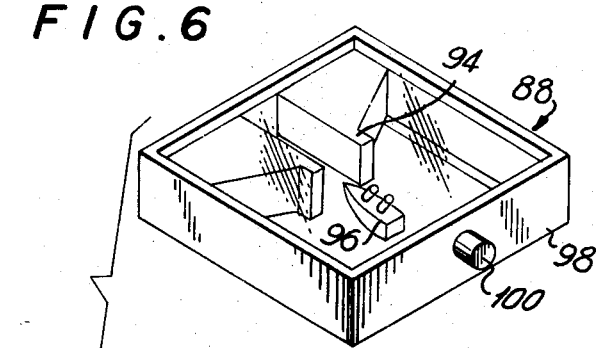
FIG.6
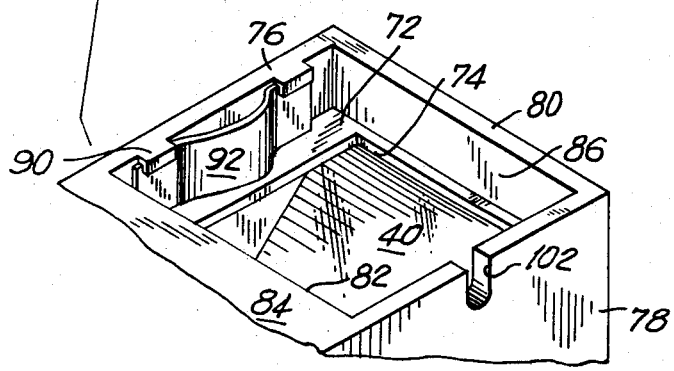
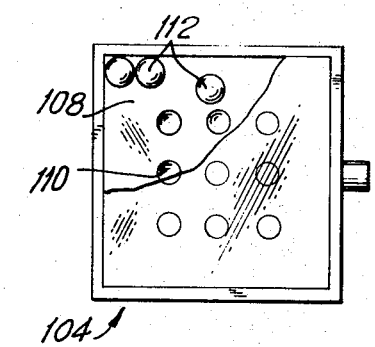
FIG.7
FIG.8
INVENTORS
ALAN A. HICKS
ERNEST J. SWIMMER
BY
ATTORNEYS June 30, 1970  A. A. HICKS ET AL  3,517,936
OPTICAL ILLUSION DEVICE
Filed May 20, 1968  3 Sheets-Sheet 3
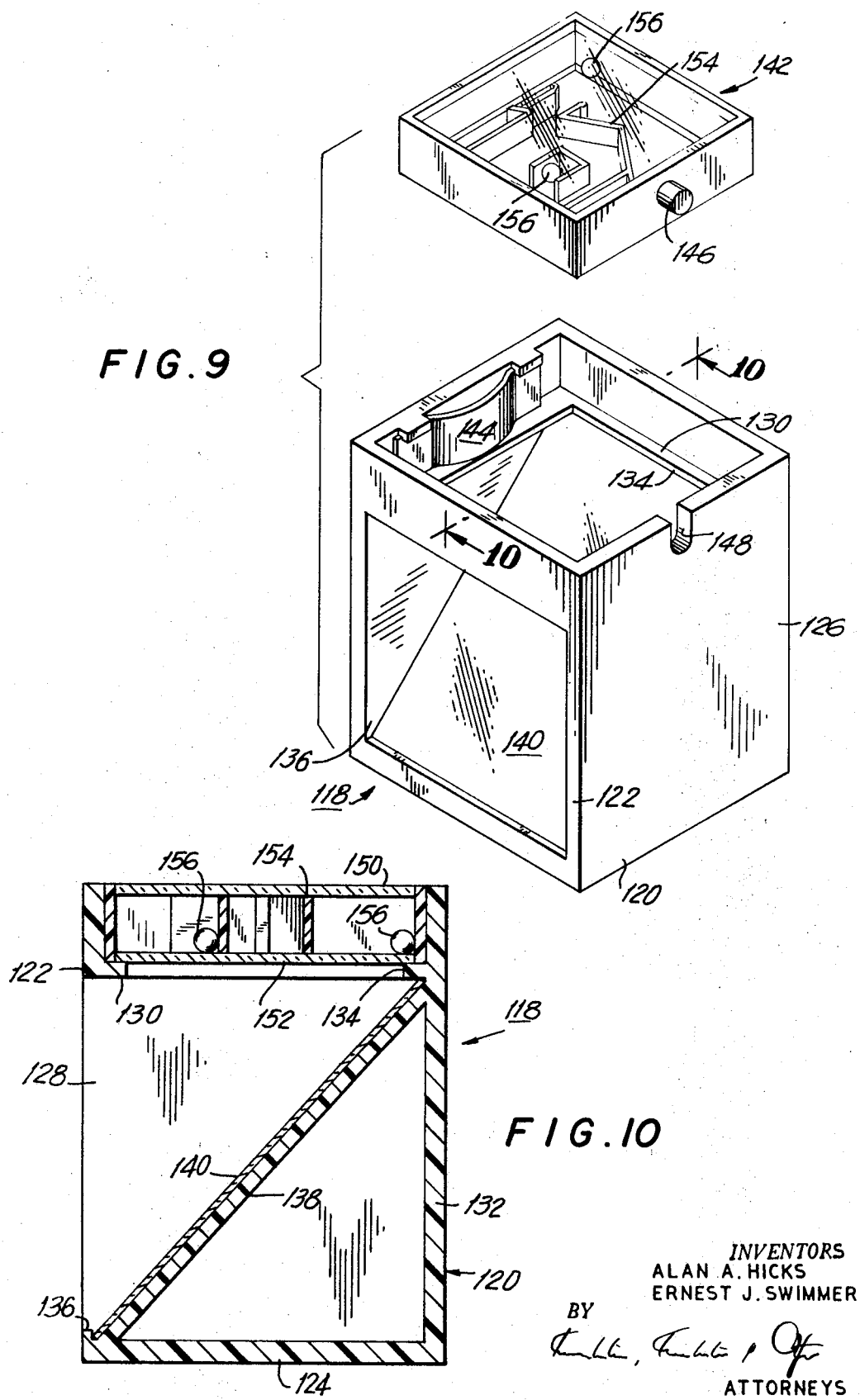
INVENTORS
ALAN A. HICKS
ERNEST J. SWIMMER
BY
ATTORNEYS United States Patent Office 3,517,936
Patented June 30, 1970

ABSTRACT OF THE DISCLOSURE

An optical illusion device in a game of skill where a singly or multiply reflected vertical image of a body movable under the influence of gravity by tilting of the device while the body is located on a generally horizontal supporting game surface, moves in one or more directions other than would normally be expected upon tilting of the device and, therefore, of the supporting surface. The device includes a support means for supporting, at a generally horizontal game area of the support means, a movable body which is to be singly or multiply reflected and then vertically imaged, this support means having, spaced from its object area, a vertical viewing area where the singly or multiply reflected vertical image of the body is visible. An optical means coacts with the object area and the viewing area to provide at the viewing area a vertical image of the body at the object area, the optical means being such that one or mutually perpendicular directions of motion of the body at the object area are imaged in one or mutually perpendicular directions of motion which are respectively different from the one or mutually perpendicular directions of motion of the body. Thus, the optical means provides at the viewing area a vertically moving (inter alia) image of a body moving horizontally over a horizontal game surface.

BACKGROUND OF THE INVENTION

The present invention relates to optical illusion devices.
In particular, the present invention relates to a game of skill which has an optical illusion device.

There are known games of skill where freely moving bodies are required to be moved by manually controlled tilting so that they will reach a certain goal. For example, a number of freely rolling ball members directly viewable on a generally horizontal surface may be required to be moved about by tilting of the game so as to be simultaneously situated in one of a number of recesses, or freely slidable or rolling bodies directed by tilting of a generally horizontal surface may be required to enter and move along a maze on that surface.

With games of skill (devices) of this general type, the operator soon learns how to manipulate the game so as to achieve the required goal, and within a relatively short period of time the game becomes boring and is no longer used. This is so because with direct viewing of the object and supporting surface the operator of the game either has or quickly builds up intuitive visual-manual reflexes as to the viewed motion of the object of the object in response to manual tilting of the supporting surface (device). It also has been proposed to use a rod or the like to manipulate on a playing surface a body indirectly viewed through a mirror. Because of the rod such a game likewise fails to hold attention.

It is accordingly a primary object of the present invention to provide a game of the above general type which will, however, require a considerably greater amount of skill than conventional games of this general type, so that the game is more difficult than conventional games and is far less boring.

In particular, it is an object of the invention to utilize in a game of skill of the above general type an optical illusion device which will provide for horizontally moving bodies viewed singly or multiply reflected vertical images of their actual movements according to which the imaged movements take place in directions to which the operator finds considerable difficulty in acquiring intuitive reflexes.

Also, it is an object of the invention to provide a game of skill of this latter type which is inexpensive and simple to manufacture.

Furthermore, it is an object of the invention to provide an optical illusion game device which can be hand-held by the operator to be very easily manipulated.

It is also an object of the invention to provide a structure where a single optical illusion device can be used wit h a number of objects which are to be imaged and which respectively have different characteristics so that the operator can use a number of different objects interchangeably.

In accordance with the invention, a support means which has a generally horizontal object game area is provided for movably supporting at the object area, a body, the movement of which over the object area, e.g. in response to tilting of the game, is to be imaged. This support means also has associated therewith, and spaced from the object area, a vertical viewing area where an image of the body movable on a vertical image of the object area is visible to the operator. The support means carries between the object area and the viewing area an optical means which provides at the viewing area a singly or multiply reflected vertical image of the body and the object area, having for one or more mutually perpendicular actual directions of motion of the body one or more mutually perpendicular image directions of motion which are different from the one or more mutually perpendicular actual body movement directions, respectively.

BRIEF DESCRIPTION OF DRAWINGS

The invention is illustrated by way of example in the accompanying drawings which form part of this application and in which:

FIG. 1 is a top plan view of an optical illusion game device of the invention employing two mirrors of which one is an erecting mirror;

FIG. 2 is a front elevation of the device of FIG. 1;

FIG. 3 is a vertical longitudinal section of the structure of FIGS. 1 and 2 taken along line 3—3 of FIG. 1 in the direction of the arrows;

FIG. 4 is a transverse sectional elevation of the structure of FIGS. 1 and 2 taken along line 4—4 of FIG. 1 in the direction of the arrows;

FIG. 5 is a sectional top plan view of the structure of FIGS. 1 and 2 taken along line 5—5 of FIG. 2 in the direction of the arrows;

FIG. 6 is a fragmentary exploded perspective illustration showing another embodiment of a structure for removably supporting an object area (puzzle) which is to be imaged, this embodiment likewise employing two mirrors of which one is an erecting mirror;

FIG. 7 is a top plan view of an object area (puzzle) which may be interchanged with that of FIG. 6;

FIG. 8 is a top plan view of a further object area (puzzle) which may be interchanged with either one of those of FIGS. 6 and 7;

FIG. 9 is an exploded perspective illustration showing another embodiment of the invention wherein only a single mirror is employed, the same being an erecting mirror; and FIG. 10 is a front-to-back sectional elevation of the structure of FIG. 9 taken along line 10—10 of FIG. 9 in the direction of the arrows.

DESCRIPTION OF PREFERRED EMBODIMENTS

Referring now to FIGS. 1-5, an optical illusion game device embodying the invention illustrated therein includes a support means 12 of box-shaped, generally rectangular configuration. The support means 12 has a front vertical wall 14 situated in a vertical front wall plane, a bottom wall 16, a pair of opposed end walls 18 and 20, a top wall 22, and a rear wall 24. The top wall 22 is formed at its left region, as viewed in FIG. 3, with an approximately square opening 26 which defines for the support means 12 a frame through which an object area where a body, which is to be imaged, is movably supported on a generally horizontal supporting surface. The front wall 14 is formed at its right portion, as viewed in FIGS. 2 and 5, with a generally square sight opening situated in a vertical plane and through which the operator may see the object area on the support means and through which opening a multiply reflected image of the horizontally supported body is visible. The supporting surface of the object area is located in a horizontal object plane which is perpendicular to the vertical plane of the front wall 14 and is situated at the top surface of the top wall 22 over the frame opening 26, while the viewing area of the support means 12 is situated in a vertical viewing plane behind the vertical sight opening 28 through which the viewing area is visible.

An optical means is carried by the support means 12 and coacts with the object and viewing areas for transmitting to the viewing area a multiply reflected image of a body at the object area. Said means includes at least two planar reflecting surfaces in planes preferably at 45° to one another and so arranged that one surface shifts the optical axis in one plane and the other shifts the optical axis in a different plane, preferably perpendicular to the first plane. This optical means includes, in the illustrated example, an exit laterally reversing reflector 30 in the form of a flat steel mirror or the like having a front reflecting surface visible through the sight opening 28 and defining the viewing area. The support means 12 includes a vertical supporting wall 32 (FIG. 5) extending from the rear wall 24 forwardly toward the front wall 14, this wall 32 having the exit reflector 30 at its forward surface. The wall 32 as well as the exit reflector 30 extends vertically between the bottom wall 16 and the top wall 22. The end wall 20 (FIG. 5) is connected at its rear vertical edge to a rear wall portion 34 which is in turn connected to a vertically extending wall 36 spaced inwardly from and extending parallel to the end wall 20 between the bottom wall 16 and the top wall 22. At its front edge this wall 36 is fixed to the wall 32. In this way the walls 32 and 36 define between themselves a rear opening 38 into which the fingers of a hand of the operator may be inserted so that the operator can conveniently grasp the walls 20 and 36 for holding the device 10 at eye-level in a manner which makes it extremely convenient for the operator to look horizontally through the vertical sight opening 28 at the viewing area defined by the front reflecting surface of the reflector 30.

In addition to the exit reflector 30, the optical means includes an entry erecting reflector 40 which may be of the same construction as the reflector 30 and which is supported by an inclined wall 42 of the support means 12. This inclined wall 42 is situated in an inclined plane which is perpendicular to the front wall 14 and extends between the front wall 14 and the rear wall 24. The inclined wall 42 extends at its top edge from the top of the left end wall 18 downwardly to the bottom wall 16 toward the right as viewed in FIG. 3. The entry reflector 40 also has a top edge at the left end wall 18, just to the left of the frame opening 26, and a bottom edge at the bottom wall 16, just to the left of the sight opening 28. Thus, while the entry reflector 40, which has an upwardly directed reflecting surface, is situated in an inclined plane which is perpendicular to the front wall 14, the entry reflector 30 is situated in the viewing plane which is perpendicular to the top wall 22 and thus to the object plane at the object area. The entry reflector 40 is situated in an inclined plane which makes a 45° angle with the horizontal object plane at the frame opening 26 while the exit reflector 30 is situated in a vertical plane which makes a 45° angle with the vertical front wall plane of the front wall. Hence, the planes of the two reflectors are at 45° with respect to one another, the reflector 30 causing 90° horizontal front-to-side deflection of the optical axis (line of sight) and the reflector 40 causing a 90° vertical-to-horizontal deflection of the optical axis. The exit reflector 30 has a bottom rear edge corner adjacent the back lower edge corner of the entry reflector 40 and a front edge adjacent the front wall 14 just to the right of the sight opening 28, as viewed in FIG. 2. By virtue of the foregoing arrangement, light passing vertically down through the frame opening 26 will be reflected horizontally (see arrow A in FIG. 3) to the right by the entry reflector 40 of the optical means and then this laterally reflected light will be reflected a second time, this time horizontally forwardly (see circle and dot in FIG. 3 representing the head of an arrow), by the exit reflector 30 through the sight opening 28 to the eye of the operator.

In order to conserve light, all of the internal surface walls of the support means 12 may be colored black, preferably dull, e.g. matte, or they may simply be molded of a black synthetic resin material in a mold with finely roughened surfaces forming the internal surfaces of the support means. The reflectors 30 and 40 can be constructed as conventional flat mirrors but need not be made of glass since it is also possible to use vacuum plated plastic or polished steel or plated metal for the reflectors.

In the particular example illustrated, the object which is located at the object area directly over the frame opening 26 is in the form of a hollow enclosure 44 of generally square configuration which may be entirely made up of pellucid synthetic plastic walls, although at least the pair of opposed horizontal upper and lower walls 46 and 48 of the enclosure should be pellucid. Preferably the upper wall 46 is matted, e.g. translucent, so as to provide for uniform diffusion of the light which passes through the object 44 to the entry reflector 40 and the lower wall 48 is transparent. The object 44 includes partitions 50 extending vertically between the opposed horizontal walls 46 and 48 and having in the illustrated example the configuration of a pitcher which is horizontally situated at the object area with its handle 52 directed forwardly, as indicated in FIG. 1. The top translucent wall 46 may in addition carry over the top of the pitcher (on the left as seen in FIG. 1) indicia such as the printed directions "FILL PITCHER" with reversely printed letters in reverse order, and the lower part of the pitcher (on the right as seen in FIG. 1) may have a simulation of a liquid as by suitable coloring of the top wall 46 between the partitions 50 from the right end of the wall 46, as viewed in FIG. 1, up to the line 54. The object further includes movable bodies which can move freely about within the enclosure. In the illustrated example there are three freely movable bodies in the form of balls 56 which can roll freely on the horizontal flat lower horizontal transparent wall 48; alternatively such bodies could be in shape of cubes to represent ice cubes—these too, would be freely movable on the horizontal flat surface of the bottom wall 48 except where blocked by the partitions 50.

The optical means 30, 40 of the invention will provide at the viewing area of the support means 12 a multiply reflected image, of the object 44 at the object area, which has mutually perpendicular directions of the object imaged respectively in mutually perpendicular directions which are different from the mutually perpendicular directions of the object. Thus, considering the forward and rearward direction of object 44 as seen in FIG. 1, it will be noted that the handle 52 of the pitcher is directed forwardly at the object (see FIG. 1) while it appears directed to the right in the image 58 which is shown at the viewing area through the sight opening 28 in FIG. 2. Moreover, it will be noted that while the pitcher at the object is situated at a horizontal attitude, bottom to the right (see FIG. 1), it appears in a vertical attitude (bottom down) at the image 58 (see FIG. 2). The reversely printed indicia, which extend at the object area forwardly from the rear toward the front, have their letters righted and appear at the multiply reflected image 58 in a normally readable direction extending horizontally from the left toward the right.

As may be seen from FIGS. 2–5, the entry reflector 40 provides an image in which, if directly viewed (see FIG. 4), the right part of the object, as viewed in FIG. 1, appears below the left part thereof, without changing the forward and rearward direction of the object as seen in FIG. 1; so that by way of the entry reflector 40 of the optical means the right and left directions of the horizontal object are changed into a substantially vertical direction, with a right direction of the object as viewed in FIG. 1 extending downwardly at the entry reflector 40 and a left direction at the object as viewed in FIG. 1 extending upwardly at the entry reflector.

The exit reflector 30, upon receiving the image from the entry reflector 40, situates the forward part of the image as viewed in FIGS. 1 and 5 to the right, as is apparent from the image 58 in FIG. 2, while the rear part of the image at the entry reflector 40 is situated to the left at the exis reflector 30.

Thus, directions to the left and right at the object are converted by the optical means into up and down image directions respectively, while directions to the front and rear at the object are converted by optical means into right and left image directions, respectively. Movement of any ball 56 or other freely movable object to the left in FIG. 1 will appear as upward movement at the multiply reflected image 58, and to the right in FIG. 1 will appear as downward movement at the multiply reflected image 58, while forward movement of a ball member 56 at the object 44 will appear as movement to the right at the multiply reflected image 58 and rearward movement of a ball member 56 at the object 44 will appear as movement to the left at the multiply reflected image 58 at the viewing area.

When using the optical illusion game 10 of the invention, the operator will face the front wall 14 with the sight opening 28 situated vertically at eye-level, and by grasping the walls 20 and 36, as well as the end wall 18 if desired, the operator can tilt the device 10 in all directions to attempt to direct the ball members 56 to within the pitcher defined by the partitions 50. Tilting of the device 10 forwardly will provide at the viewing area images where the ball members 56 will move to the right, while tilting of the device rearwardly will result in images of the ball members moving to the left at the multiply reflected image 58. Lateral tilting, where the end wall 18 is lowered with respect to the end wall 20, will result in an image of movement of the ball members 56 in an upward direcion at the multiply reflected image 58, while the opposed direction of tilting movement, where the wall 18 is tilted upwardly with respect to the wall 20, will result in an image of downward movement of the ball members at the multiply reflected image 58. Since this latter type of lateral tilting about an axis perpendicular to the wall 14 is normally associated in the mind of the operator with horizontal movement to the left and right, the appearance of vertical movement is quite unexpected, and since tilting forwardly and rearwardly about an axis parallel to the wall 14 is normally associated with up and down movement, the resulting image movement to the right and left also is quite unexpected. As a result, a considerable amount of skill is required for the operator to coordinate his hand movements with the image movements in order to locate the ball members 56 within the pitcher. Furthermore, the necessity of directing a ball member through a small opening presents added difficulty because, in reality, the ball is rolling on a slightly tilted generally horizontal surface and will tend to roll right past the small opening constituting the mouth of the pitcher. Also the use of several balls enhances the difficulty because when less than all the balls are contained in the pitcher they readily roll out when attempting to trap the last ball.

In the example illustrated in FIGS. 1–5, the object 44 is fixed to a second object 60 in the form of an enclosure whose configuration may be identical with the enclosure of the object 44. The opposed parallel horizontal pellucid walls 46 and 48 have integral extensions which form the opposed pellucid walls of the object 60, and between their peripheral enclosure walls these walls 46 and 48 of the objects 44 and 60 are respectively formed with aligned openings through which a pivot screw 62 passes. The top of this screw is fixed in the top wall 22, so that the pair of interconnected objects 44 and 60 can be swung about the pivot 62 to locate either the object 44 or the object 60 at the object area. Sufficient friction is provided at the pivot to hold the selected object over the frame opening 26. The object 60 presents a different puzzle problem, and for this purpose has between its opposed, parallel, pellucid walls 46 and 48 partitions 64 defining, as shown in FIG. 1, an enclosure having a narrow entrance end 66 and inner compartments 68. In the illustrated example there are three inner compartments 68 and three freely movable bodies 70 also in the form of ball members. Thus, when the object 60 is situated at the object area over the opening 26 the operator will manipulate the device 10 to attempt to locate the several bodies 70 respectively in the compartments 68. Here, too, difficulty of manipulation is increased by the narrow entrance and multiple balls, as well as by the unnatural imaged motions of the balls resulting from the unusual optical system having reflecting surfaces in skewed relationship which causes the optical line of sight (axis) to turn in different planes.

Another construction for supporting an object at the object area is illustrated in FIG. 6. With this embodiment the front, rear and end walls of the support means extend above the top wall 72 thereof, which is provided with a frame opening 74 corresponding to the frame opening 26. The optical means of this embodiment is identical with that of FIGS. 1–5 and the entry reflector 40 is visible in FIG. 6 beneath the frame opening 74. The upper portions of the front wall 76, rear wall 78 and end wall 80 of this embodiment define with an edge 82 of the top wall 84 a square seating recess 86 having inner vertical surfaces and an open top in order to receive a square object such as the object 88 indicated in FIG. 6. The front wall 76 has angle retainers 90 which constrain the free ends of a bowed leaf spring 92 for movement along the inner surface of the front wall 76, the bottom edge of the leaf spring resting directly on the top wall 72 forwardly of the frame opening 74 thereof. The object 88 can very easily be introduced into the seating recess 86, pressing a wall against the leaf spring 92 which frictionally retains it within said recess at the object area directly over the frame opening 74.

The object 88 also has a translucent and a lower transparent parallel, horizontal wall between which there are blocks 94 defining a path of movement for a freely movable body. In the illustrated example, the partitions 94 simulate the docking area (slip) of a pier while the freely movable body 96 is in the form of a flat-bottomed slidable block having the configuration of a ship which is required to be moved into the space defined by the partitions 94. The object 88 has a rear wall 98 provided with a projecting pin 100 which is received in a notch 102 extending downwardly from the top edge of the rear wall 78, so that in this way the object 88 will be properly oriented.

The object 88 of FIG. 6 can readily be removed and replaced by the other objects such as the objects 104 and 106 respectively illustrated in FIGS. 7 and 8. The object 104 is in the form of an enclosure having upper and lower parallel, horizontal pellucid walls. The lower transparent wall 108 is formed with depressions 110 for respectively receiving the freely movable balls 112. With the arrangement shown in FIG. 7, the balls 112 are intended to be moved so as to complete a tic-tac-toe game.

In the object 106 of FIG. 8 the structure includes a partition 114 forming a maze for a freely movable ball member 116, the maze having a narrow entry end for the purpose of enhancing difficulty of play.

Of course, the drawings as thus far discussed show a relatively small number of possible examples of objects which can be used with the device 10 of the invention. Thus, the objects may take the form, for example of a basket to receive a ball, pegs on which one or more tubular cylindrical bodies, capable of rolling and sliding, are to be received, with these pegs having different lengths corresponding to different scores. Also, the object may constitute a marking receiving area located over the frame opening and having printed means such as a maze which a person tries to trace through with a marking pencil while viewing the multiply reflected image.

Furthermore, while the above-described structure of the optical means is preferred because of the low cost and simplicity, it is also possible to use an optical means in the form of a transparent block forming a prism having inclined reflecting surfaces corresponding to the reflecting surfaces of the reflectors 30 and 40.

It will be now apparent that it is a characteristic of the invention as thus far described that there are at least two reflecting surfaces between the object area and the viewing area, which surfaces reflect the line of sight in such a manner that the incident and reflected lines of sight of two successive surfaces define for each surface a plane that is angularly disposed with respect to the plane of the other surface. In the preferred form of those detailed above the incident and reflected lines of sight for each reflecting surface are 45° to that surface, the angle between the planes is 90°, the object area is horizontal, the viewing area is vertical, and there are only two reflecting surfaces, one being erecting and the other laterally reversing.

Up to this point the invention has been described as using two reflecting surfaces of which one laterally reverses and the other erects an image; the device may be simplified in construction and be made less confusing to manipulate, while still remaining highly interesting to play by eliminating the lateral reversing reflecting surface but retaining the erecting reflecting surface so that the user still is confronted with the enigma that a body which moves over a substantially horizontal game surface in response to manual tilting will experience, in response to a certain direction of tilting or its reverse, vertical rather than horizontal movement. Hence the device maintains a sufficient element of unexpectedness of motion of the body to hold the user's attention for long periods of play.

In FIGS. 9 and 10 such a simplified optical illusion game 118 is illustrated. Said game includes a support means 120 of a generally cubical configuration. The support means has a front vertical wall 122 situated in a vertical front wall plane, a bottom wall 124, a pair of opposed side walls 126, 128, a top wall 130, and a rear wall 132. The top wall is formed with an approximately square opening 134 which defines for the support means 120 a frame through which an object area where a body, which is to be imaged, is movably supported on a generally horizontal supporting game surface responsive to manual tilting of the support means. The front wall 122 is formed with an approximately square sight opening 136 situated in a vertical plane through which the user may see the object area and through which opening a singly reflected vertically movable image of the horizontally supported body is visible. The supporting game surface of the object area is located in a horizontal object plane which is perpendicular to the vertical plane of the front wall 122 and is situated at the top surface of the top wall 130 over the frame opening 134, while the viewing area of the support means 120 is situated in a viewing plane behind the vertical sight opening 136 through which the viewing area is visible.

An optical means is carried by the support means and coacts with the object and viewing areas for transmitting to the viewing area a singly reflected erected image of the horizontal object area and the body thereat. Said means constitutes an upwardly and rearwardly inclined planar erecting reflecting surface in a plane at 45° to the plane of the frame opening 134 and at 45° to the plane of the sight opening 136. The reflecting surface preferably is a steel mirror with a specular reflecting surface.

The support means includes a supporting wall 138 extending from adjacent the back top edge of the frame opening 134 to adjacent the front bottom edge of the sight opening 136. An erecting reflecting surface 140 is supported by the wall 138, said reflecting surface directing horizontally forwardly through the sight opening 136 light entering vertically downwardly through the frame opening 134. In so doing, the reflecting surface will form at the sight opening an erected image of a horizontal object area over the frame opening.

Preferably the inner visible surfaces of the support means are of a low order of reflectivity, e.g. a dull dark color, for example flat black.

Suitable means such, for example, as shown in FIG. 6 and described in detail hereinabove, is provided to detachably receive an object 142 in horizontal position on the top wall 130 directly above the frame opening 134. The object 142 is generally similar to the objects 88, 104 and 106 designed to be used with the support means of FIG. 6. There are slight differences between the overall configuration of the object and the object receiving means of FIG. 6 and of FIG. 9, one simply being that the flat retaining spring 144 of FIG. 9 is situated on an extension of the left side wall 128 of the support means 120 instead of an extension of the front wall 76 as in FIG. 6. The other is that the projecting pin 146 and notch 148 are located at the right side of the illusion device in FIG. 9 instead of at the back as in FIG. 6. These differences are of no consequence and, if desired, the corresponding locations of the spring 144, pin 146 and notch 148 could be identical to those illustrated in FIG. 6.

The object 142 has upper and lower horizontal parallel spaced pellucid walls 150, 152, the upper wall being translucent and the lower wall transparent. Physical impediment means such as partitions 154 between the walls 150, 152 define a game area which in this instance is in the shape of a houselike maze with the top of the chimney defining a narrow entrance opening and with a one-side-open square inside the house. The narrow open side of the square faces in a direction opposite to the opening of the chimney to enhance difficulty of play. A pair of balls 156 are disposed in the hollow interior of the object 142, being freely movable over the playing surface of the lower wall 152 in response to tilting of the game 118.

Because of the omission of the lateral reversing reflecting surface in the game 118 the bottom of the house formed by the portions 154 are at the front of the game so that when singly reflected the house will be upright. This, too, differs from the game previously described in FIGS. 1–5 wherein the bottom of the kitchen (as viewed) delineated by the partitions 50 faces sidewise rather than forwardly because of the inclusion of the second reflecting surface.

In the play of the game 118 tilting the support means, and hence the object 142, right or left will cause the viewed images of the balls to move in the expected directions, i.e. to the right if the right side of the game is slightly lowered and vice versa. However, when the support means is tilted forwardly or rearwardly an unexpected movement of the imaged balls occurs. Thus raising the front of the game will cause the image of the balls to move vertically upwardly and vice versa; hence the user is unable to use his normal visual-manual reflexes but must, to solve the game, acquire a new set of skills to which his mind will not readily adapt.

The use of two or more balls increases the difficulty of play, particularly in conjunction with the opposed directions of the narrow openings, i.e., the chimney entry opening defined by the portions 154 and the goal opening defined by the square-forming portions within the house. If the user succeeds in reaching the goal with one ball while the other ball remains outside the house, he is almost certain to roll the first ball out of the goal while attempting to get the second ball down the chimney. The narrowness of the openings through which the balls must pass is another difficult facet because the balls being situated in fact on a horizontal game surface roll rapidly past the openings in response to slight side tilting.

As in the case of the games described with respect to the multiply reflected image, the freely movable body or bodies in the FIG. 9 form of the invention may assume forms other than balls, e.g. cylinders, or bodies having flat bottoms. A tremendous variety of playing surfaces can also be used with the game 118, these including those described in connection with FIGS. 1–8 as well as numerous others.

It thus will be seen that there are provided devices which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

What is claimed is:

1. In an optical illusion game, a hollow object to be imaged; support means for horizontally supporting said object, said object having a horizontal object area said support means having spaced from said object area a sight opening where an image of said object area is viewed by the operator, optical means carried by said support means and coacting with said object area and said sight opening for transmitting to said sight opening an image of said object area, which image has actual mutually perpendicular directions of said object area imaged by multiple reflections to said sight opening in mutually perpendicular directions which are respectively different from said actual mutually perpendicular directions of the object area, said object area including a transparent horizontal generally plane game surface, and a body captive in the object and movable over the game surface in response to manual tilting of the game, said game surface having physical impediment means located on and extending from the game surface and being at least in part inwardly of the periphery of the game surface, said body being movable over the game surface with respect to said impediment means by manual manipulation of the game by a user viewing the game surface, the body and said impediment means through the sight opening, the image of the body moving vertically in response to tilting of the game about a horizontal axis parallel to the object area and perpendicular to the sight opening and moving horizontally in response to manual tilting of the game about a horizontal axis parallel to the sight opening.

2. The combination of claim 1 wherein said sight opening has a generally upright attitude and wherein said actual mutually perpendicular directions of said object area are a generally left and right direction and a generally forward and rearward direction, said optical means providing at said sight opening an image of said actual left and right direction at the object area which extends in a generally vertical direction and an image of said actual generally forward and rearward direction at said object area which extends in a generally left and right direction.

3. The combination of claim 2 wherein the movements of the body over the object area to the left and right in said generally left and right direction and forwardly and rearwardly in said generally forward and rearward direction are imaged at said sight opening by said optical means as a vertical movement of the image of said moving body in response to actual movement of said body to the left and right and as a lateral movement of the image of said moving body in response to actual movement of said body forwardly and rearwardly.

4. The combination of claim 3 wherein said support means is small enough to be hand-held by the operator with said sight opening at eye-level.

5. The combination of claim 1 wherein said optical means includes an exit reflecting surface at said sight opening visible to the operator for providing a visible image of said object area and at least one intermediate reflecting surface situated along a light path extending from said object area to said reflecting surface for participating in the transmission of an image from said object area to said exit reflecting surface, said reflecting surfaces being tilted about parallel non-intersecting axes.

6. The combination of claim 5 wherein said intermediate reflecting surface directly reecives an image of said object area and transmits it directly to said exit reflecting surface, said object area, said intermediate reflecting surface and said exit reflecting surface being located in different orientations which turn the line of sight in different planes that are angularly interrelated.

7. The combination of claim 6 wherein said support means includes a front wall formed with the sight opening, said front wall being situated, during operation of the game in a generally vertical front wall plane perpendicular to said horizontal object area, said exit reflecting surface being situated behind and visible through said sight opening of said front wall and being situated in a generally vertical plane perpendicular to said object area and intersecting said front wall plane at an angle of approximately 45°, and said intermediate reflecting surface being situated in an inclined plane which is perpendicular to said front wall plane and which intersects the plane of said area at approximately 45°.

8. The combination of claim 7 wherein said object area plane is situated substantially at the elevation of an upper edge region of said front wall and said intermediate reflecting surface being inclined downwardly from said object area plane toward said sight opening and terminating in a lower edge region of said front wall, said exit reflecting surface extending vertically between said upper and lower edge regions of said front wall and having a front edge adjacent said front wall and distant from said intermediate reflecting surface and a rear edge distant from said front wall and adjacent said lower edge of said intermediate reflecting surface.

9. The combination of claim 8 wherein said intermediate and exit reflecting surfaces respectively form parts of flat intermediate and exit reflectors with said intermediate reflector having an upper inclined reflecting surface directed on the one hand upwardly toward said object area and on the other hand horizontally toward said exit reflector while said exit reflector has a front reflecting surface directed on the one hand toward said intermediate reflector and on the other hand forwardly toward said sight opening of said front wall.

10. The combination of claim 1 wherein the hollow object is a hollow enclosure having a pair of opposed horizontal pellucid walls through which light can pass to said optical means.

11. The combination of claim 10 wherein the body is a ball.

12. The combination of claim 10 wherein the body is a sliding body.

13. The combination of claim 10 wherein the physical impediment means includes partitions extending between said opposed pellucid walls thereof to define a desired path of movement of the body.

14. The combination of claim 13 wherein a pair of said enclosures are fixed to each other on the support means and are turnably carried thereby with each enclosure having partitions of different configurations therein so that bodies in said enclosures will define different paths of movement in said enclosures, respectively, whereby a selected one of said enclosures may be situated at said object area.

15. The combination of claim 10 wherein the support means removably carries said enclosure so that one object may be replaced by another object which provides for the moving body a desired movement different from that provided by said one object.

16. An optical illusion game including a hollow object to be imaged, said object having a horizontal object area, said object area including a transparent horizontally generally plane game surface, a body captive in the object and movable over the game surface in response to manual tilting of the game, said game surface having physical impediment means located on and extending from the game surface and being at least in part inwardly of the periphery of the game surface, a sight opening and at least two reflecting surfaces transmitting a line of sight between said object area and said sight opening, which surfaces reflect the line of sight in a manner such that the incident and reflected lines of sight of two successive reflecting surfaces define for each surface a plane that is angularly disposed with respect to the plane of the other surface.

17. An optical illusion game as set forth in claim 16 wherein the sight opening is generally vertical.

18. An optical illusion game as set forth in claim 16 wherein the incident and reflected lines of sight for each reflecting surface are about 45° to that surface and the angle between the planes is about 90°.

19. An optical illusion game as set forth in claim 18 and wherein the sight opening is generally vertical and there are only two reflecting surfaces.

20. An optical illusion game including a hollow object to be imaged; support means for horizontally supporting said hollow object, said object having a horizontal object area, said support means having spaced from said object area a vertical sight opening through which an erected vertical image of the object area is viewed by the operator, a single erecting reflecting surface at 45° to the horizontal object area and at 45° to the vertical sight opening, said object area including a transparent horizontal generally plane game surface, and a body captive in the object and movable over the game surface in response to manual tilting of the game, said game surface having physical impediment means located on and extending from the game surface and being at least in part inwardly of the periphery of the game surface, said body being movable over the game surface with respect to said impediment means by manual manipulation of the game by a user viewing the game surface the body and said impediment means through the sight opening, the image of the body moving vertically in response to manual tilting of the game about a horizontal axis parallel to the object area and parallel to the sight opening and moving horizontally in response to manual tilting of the game about a horizontal axis perpendicular to the sight opening.

21. An optical illusion game as set forth in claim 20 wherein the object has a pair of opposed horizontal walls through which light can pass to said reflecting surface, the lower wall being the transparent game surface.

22. An optical illusion game as set forth in claim 20 wherein the body is a ball.

References Cited
UNITED STATES PATENTS

| | | | |
|---|---|---|---|
| 951,755 | 3/1910 | Crane | 350—302 |
| 2,261,804 | 11/1941 | Hall | 273—113 |
| 2,557,654 | 6/1951 | Hagner | 33—206 |
| 3,218,754 | 11/1965 | Hunter | 273—109 XR |
| 3,348,448 | 10/1967 | Callahan | 350—301 XR |

FOREIGN PATENTS 1,016,200  1966  Great Britain.

ANTON O. OECHSLE, Primary Examiner

P. E. SHAPIRO, Assistant Examiner

U.S. Cl. X.R.

35—58; 273—1; 350—301